(12) United States Patent
Mei et al.

(10) Patent No.: US 11,067,853 B1
(45) Date of Patent: Jul. 20, 2021

(54) DISPLAY DEVICE AND DISPLAY OPTIMIZATION METHOD

(71) Applicant: Wuhan China Star Optoelectronics Technology Co., Ltd., Hubei (CN)

(72) Inventors: Xindong Mei, Hubei (CN); Shaojun Hou, Hubei (CN); Chao Wang, Hubei (CN); Guanghui Liu, Hubei (CN); Zhifu Li, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/975,403

(22) PCT Filed: Jun. 30, 2020

(86) PCT No.: PCT/CN2020/099382
§ 371 (c)(1),
(2) Date: Aug. 25, 2020

(30) Foreign Application Priority Data

Jun. 15, 2020 (CN) .......................... 202010541172.5

(51) Int. Cl.
*G02F 1/13357* (2006.01)
*G02F 1/1335* (2006.01)
*G09G 3/34* (2006.01)

(52) U.S. Cl.
CPC .. *G02F 1/133611* (2013.01); *G02F 1/133524* (2013.01); *G09G 3/3406* (2013.01); *G09G 2320/0233* (2013.01); *G09G 2320/0673* (2013.01)

(58) Field of Classification Search
None
See application file for complete search history.

(56) References Cited

U.S. PATENT DOCUMENTS

| | | | | |
|---|---|---|---|---|
| 9,564,103 | B2 * | 2/2017 | Huang | G06F 1/3212 |
| 2007/0070002 | A1 * | 3/2007 | Fujita | G09G 3/3406 345/87 |
| 2008/0135759 | A1 | 6/2008 | Yoshimura | |
| 2008/0284720 | A1 * | 11/2008 | Fukutome | G09G 3/3406 345/102 |
| 2011/0193897 | A1 * | 8/2011 | Park | G09G 3/342 345/691 |

(Continued)

FOREIGN PATENT DOCUMENTS

| | | |
|---|---|---|
| CN | 109061922 | 12/2018 |
| CN | 109817160 | 5/2019 |

(Continued)

*Primary Examiner* — Fred Tzeng

(57) ABSTRACT

A display device and a display optimization method are disclosed. The display device includes a display screen configured to provide a first display region and a second display region; a first backlight member disposed within the first display region; a light guiding member, a second backlight member, and a camera disposed within the second display region; and a controller adjusting backlight-current of one of the first backlight member and the second backlight member according to a difference between two backlight-brightness levels which are measured within the first display region and the second display region until the two backlight-brightness levels are the same ones. Therefore, it can solve a problem of a visual difference within a display region in the prior art.

13 Claims, 6 Drawing Sheets

(56) References Cited

U.S. PATENT DOCUMENTS

2017/0018231 A1* 1/2017 Liu ...................... G09G 3/3426
2018/0149920 A1* 5/2018 Yamazaki ............. G06F 3/0443

FOREIGN PATENT DOCUMENTS

| CN | 110349543 | 10/2019 |
| CN | 110515237 | 11/2019 |
| CN | 110619836 | 12/2019 |
| CN | 111210756 | 5/2020 |

* cited by examiner

DISPLAY DEVICE AND DISPLAY OPTIMIZATION METHOD

RELATED APPLICATIONS

This application is a National Phase of PCT Patent Application No. PCT/CN2020/099382 having International filing date of Jun. 30, 2020, which claims the benefit of priority of Chinese Patent Application No. 202010541172.5 filed on Jun. 15, 2020. The contents of the above applications are all incorporated by reference as if fully set forth herein in their entirety.

FIELD AND BACKGROUND OF THE INVENTION

The present disclosure relates to the technical field of display, and specifically to a display device and a display optimization method with a function of an under-screen camera.

With the development of display technology, screens with high screen-to-body ratio have become a mainstream trend. For example, display devices in which each has an under-screen camera and takes into account both lighting and display functions have become a new demand trend.

However, in existing display device having under-screen cameras, there will be a visual difference between a portion of a display region above the camera and the other portion of the display region. For example, backlights used in different display regions are different, and transmittances in different display regions are different. When a picture is displayed by the different display regions together, there will be a difference in brightness, which affects visual effects of a full-screen and causes a poor user experience.

Therefore, it is necessary to provide a solution to solve the problems existing in the prior art.

SUMMARY OF THE INVENTION

The present disclosure provides a display device and a display optimization method, to solve a problem of a visual difference within a display region in the prior art.

In order to realize the above object, one aspect of the present disclosure provides a display device, which includes a display screen configured to provide a first display region and a second display region, wherein the display screen includes two polarizers, an array substrate, a color film substrate, and a liquid crystal layer, each of the array substrate and the color film substrate is disposed on one of the two polarizers, the liquid crystal layer is disposed between the array substrate and the color film substrate, and each of the two polarizers is arranged within the first display region; a first backlight member disposed on one side of the display screen providing the first display region, wherein the first backlight member has a first opening that is aligned with the second display region; a light guiding member disposed in the first opening of the first backlight member; a second backlight member disposed on one side of the light guiding member away from the display screen, wherein the second backlight member has a second opening, and the second backlight member and the first backlight member overlap around the first opening; a camera disposed in the second opening of the second backlight member; a first backlight driver electrically connected to the first backlight member; a second backlight driver electrically connected to the second backlight member; and a controller electrically connected to the first backlight driver and the second backlight driver, wherein the controller adjusts backlight-current of one of the first backlight member and the second backlight member according to a difference between two backlight-brightness levels that are measured within the first display region and the second display region, until the two backlight-brightness levels are the same ones.

In one embodiment of the present disclosure, the display device further includes a display driver that is electrically connected to the display screen and the controller, wherein the controller is configured to adjust a grayscale-voltage for one of the first display region and the second display region according to a difference between two gamma-curves that are measured within the first display region and the second display region, until the two gamma-curves are the same ones.

In order to realize the above object, another aspect of the present disclosure provides a display device, which includes a display screen configured to provide a first display region and a second display region; a first backlight member disposed on one side of the display screen providing the first display region, wherein the first backlight member has a first opening that is aligned with the second display region; a light guiding member disposed in the first opening of the first backlight member; a second backlight member disposed on one side of the light guiding member away from the display screen, wherein the second backlight member has a second opening; a camera disposed in the second opening of the second backlight member; a first backlight driver electrically connected to the first backlight member; a second backlight driver electrically connected to the second backlight member; and a controller electrically connected to the first backlight driver and the second backlight driver, wherein the controller adjusts backlight-current of one of the first backlight member and the second backlight member according to a difference between two backlight-brightness levels that are measured within the first display region and the second display region, until the two backlight-brightness levels are the same ones.

In one embodiment of the present disclosure, the display device further includes a display driver that is electrically connected to the display screen and the controller, wherein the controller is configured to adjust a grayscale-voltage for one of the first display region and the second display region according to a difference between two gamma-curves that are measured within the first display region and the second display region, until the two gamma-curves are the same ones.

The display screen includes two polarizers, an array substrate, a color film substrate, and a liquid crystal layer, wherein each of the array substrate and the color film substrate is disposed on one of the two polarizers, the liquid crystal layer is disposed between the array substrate and the color film substrate, and each of the two polarizers is arranged within the first display region.

In one embodiment of the present disclosure, the second backlight member and the first backlight member overlap around the first opening.

In order to realize the above object, another aspect of the present disclosure provides a display optimization method which is applied to a display device providing two adjacent display regions, wherein the display optimization method includes a brightness-adjusting step for acquiring two backlight-brightness levels that are measured within the two adjacent display regions, adjusting backlight-current for one of the two adjacent display regions according to a difference between the backlight-brightness levels, and repeatedly performing the brightness-adjusting step until the two backlight-brightness levels are the same ones; and a grayscale-adjusting step for acquiring two gamma-curves that are measured within the two adjacent display region, adjusting a grayscale-voltage of one of the two adjacent display regions according to a difference between the two gamma-curves, and repeatedly performing the grayscale-adjusting step until the two gamma-curves are the same ones.

In one embodiment of the present disclosure, the two adjacent display regions are set to a first display region and a second display region, the first display region is around the second display region, to perform the brightness-adjusting step and the grayscale-adjusting step.

In one embodiment of the present disclosure, the grayscale-adjusting step includes measuring the two gamma-curves within the first display region and the second display region, performing a determination for determining whether the two gamma-curves are the same ones; if yes, stopping the grayscale-adjusting step; if no, correcting the grayscale-voltage of the second display region according to a voltage-to-transmittance curve, re-measuring the gamma-curve of the second display region, and then re-performing the determination regarding the gamma-curves.

In one embodiment of the present disclosure, the two adjacent display regions are set to a first display region and a second display region, the first display region is around the second display region, to perform the brightness-adjusting step; and both of the two adjacent display regions are divided into a plurality of sub-regions, in which the two adjacent display regions are set to adjacent two of the sub-regions, to perform the grayscale-adjusting step.

In one embodiment of the present disclosure, the grayscale-adjusting step includes measuring the two gamma-curves within the two sub-regions, performing a determination for determining whether the two gamma-curves are the same ones; if yes, stopping the grayscale-adjusting step; if no, correcting the grayscale-voltage of one having a smaller outer diameter of the two adjacent sub-regions according to a voltage-to-transmittance curve, re-measuring the gamma-curve of one having the smaller outer diameter of the two adjacent sub-regions, and then re-performing the determination regarding the gamma-curves.

In one embodiment of the present disclosure, the brightness-adjusting step includes measuring the two backlight-brightness levels within the first display region and the second display region, performing a determination for determining whether the two backlight-brightness levels are the same ones; if yes, stopping the brightness-adjusting step; if no, correcting the backlight-current for the second display region according to a current-to-luminance curve, re-measuring the backlight-brightness level for the second display region, and then re-performing the determination regarding the backlight-brightness levels.

Compared with the prior art, the display device and display optimization method of the present disclosure adjust the backlight-current of two adjacent display regions according to the difference between the backlight-brightness levels for the two adjacent display regions, until the two backlight-brightness levels of the two adjacent display regions are the same ones. Further, the grayscale-voltage of the two adjacent display regions are adjusted according to the difference of the gamma-curves between the two adjacent display regions, until the gamma-curves of the two adjacent display regions are the same ones. Therefore, the visual differences (such as brightness and grayscale) between the two adjacent display regions are eliminated, and the situation of the visual differences within the display regions in the prior art is improved. When the display device is operated in a display mode, a picture can be displayed in a coordinated manner, to realize a screen-to-body ratio of nearly 100% on mobile phones. When the display device is operated in a lighting mode, requirements of photography and display can be met, so as to realize the compatibility of display and photography in the display device.

DESCRIPTION OF SPECIFIC EMBODIMENTS OF THE INVENTION

The description of the following embodiments refers to the attached drawings to illustrate specific embodiments that the present disclosure can be implemented. Further, the directional terms mentioned in the present disclosure, such as up, down, top, bottom, front, back, left, right, inside, outside, side, surrounding, center, horizontal, transversal, vertical, longitudinal, axial, radial, the uppermost layer, or the lowermost layer, etc., are only for reference in the direction of the attached drawings. Therefore, the directional terms are used to describe and understand the present disclosure, but not to limit the present disclosure.

Figure 1:
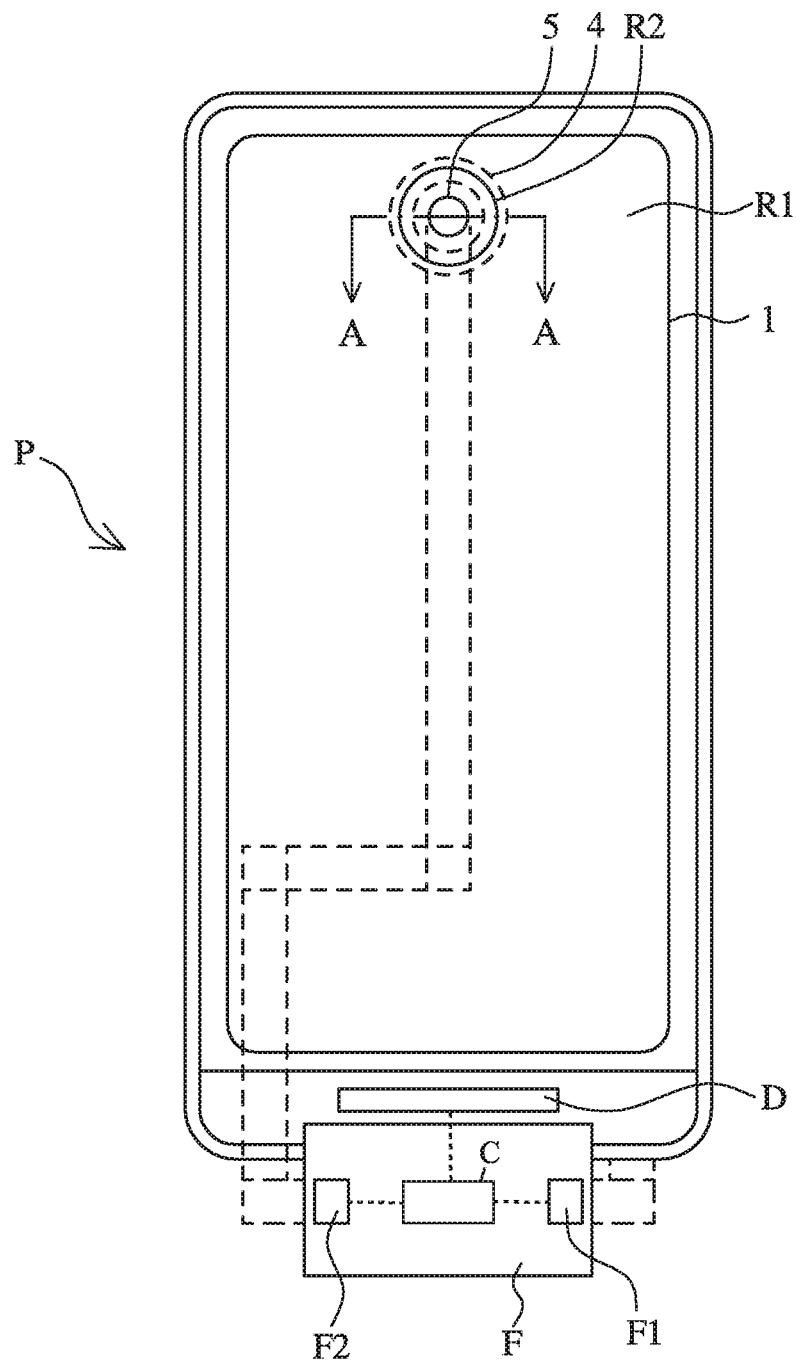
FIG. 1 is a schematic diagram of a display device configured as a smartphone, according to an embodiment of the present disclosure.

Please refer to FIG. 1, the display device of the embodiment of the present disclosure can be various display devices with functions of under-screen photography and display. For example, the display device can be configured as, but is not limited to, a smartphone (shown as P, in the figure). The display device can also be configured as various display devices with other functions, such as a tablet computer or a desktop screen, and only a smartphone is used as an example for an illustration.

Figure 2:
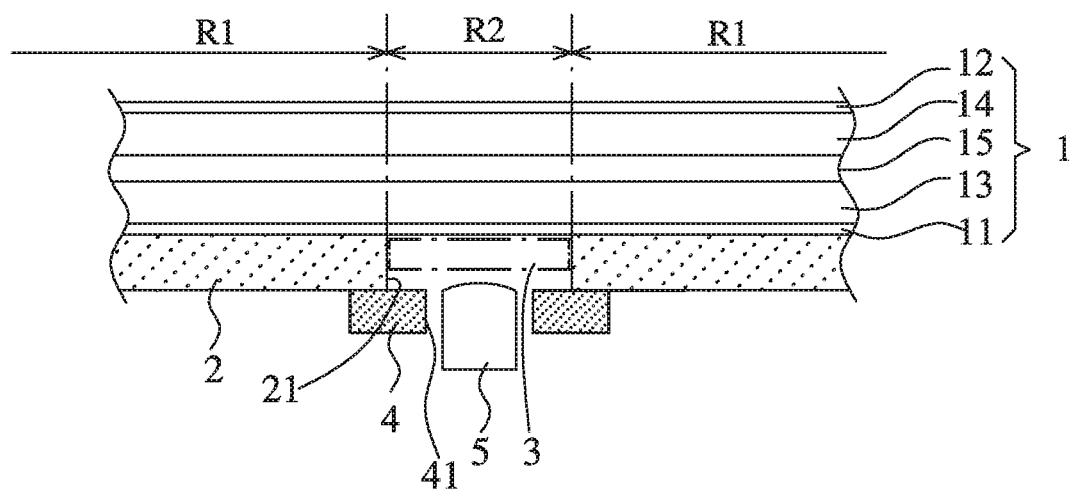
FIG. 2 is a schematic cross-sectional view of a first example taken along a line A-A in FIG. 1.

As shown in FIGS. 1 and 2, the display device has a first display region R1 and a second display region R2. For example, the first display region R1 is around the second display region R2, such as the first display region R1 surrounding the second display region R2, or the first display region R1 located outside of a portion of a boundary of the second display region R2. Specifically, the display device includes a display screen 1, a first backlight member 2, a light guiding member 3, a second backlight member 4, and a camera 5. The display screen 1 can be configured to provide the first display region R1 and the second display region R2. The first backlight member 2 is disposed on one side of the display screen 1 providing the first display region R1, such that the first backlight member 2 is located within the first display region R1. The first backlight member 2 may have a first opening 21. The first opening 21 and the second display region R2 are aligned with each other. The light-guiding member 3 is disposed in the first opening 21 of the first backlight member 2. The second backlight 4 is arranged on one side of the light-guiding member 3 away from the display screen 1. The second backlight 4 has a second opening 41. The camera 5, such as a photosensitive coupling element (CCD), is arranged in the second opening 41 of the second backlight member 4.

Specifically, as shown in FIG. 1, the smartphone (shown as P, in the figure) is taken as an example. The display device may also include other components, such as a flexible circuit board F, a first backlight driver F1, a second backlight driver F2, and a display driver D. The flexible circuit board F can be configured to electrically connect the first backlight driver F1 and the first backlight member 2. Also, the flexible circuit board F can be configured to electrically connect the second backlight driver F2 and the second backlight member 4. The first backlight driver F1 is configured to drive the first backlight member 2 to generate a backlight source. Also, the second backlight driver F2 is configured to drive the second backlight member 4 to generate another backlight source, for example, outputting driving current as backlight-current, to adjust the backlight-brightness of the above backlight member. The flexible circuit board F can also be configured to electrically connect the display driver D and the display screen 1, for driving the display screen 1 to generate images for display. Furthermore, the display device may also include a controller C, such as, but is not limited to, a central processing unit (CPU) or an application-specific integrated circuit (ASIC). The controller C can be electrically connected to the first backlight driver F1 and the second backlight driver F2 for controlling the brightness of the first backlight member 2 and the second backlight member 4. The controller C may also be electrically connected to the display driver D and the camera 5 for controlling the display screen 1 and the camera 5, but being not limited to them. The display driver D and the camera 5 can also be controlled by other components with signal processing functions, such as a digital signal processor (DSP) or an application-specific integrated circuit, such that the display screen 1, the first backlight member 2, the second backlight member 4, and the camera 5 can work together according to different usage scenarios. For example, the camera 5 can capture images, and the display screen 1 can display images.

It should be noted that, as shown in FIG. 1, the controller C can adjust backlight-current of one of the first backlight member 2 and the second backlight member 4 according to a difference between two backlight-brightness levels which are measured within the first display region R1 and the second display region R2. For example, by adjusting the backlight-current corresponding to the display region with a smaller area (such as the second display region R2), an optimal adjustment effect can be obtained, until the two backlight-brightness levels of the two backlights are the same ones.

Additionally, as shown in FIG. 1, the controller C can also adjust a grayscale-voltage for one of the first display region R1 and the second display region R2 according to a difference between the two gamma-curves which are measured within the first display region R1 and the second display region R2. For example, by adjusting the grayscale-voltage of the display region with a smaller area (such as the second display region R2), the optimal adjustment effect can be achieved, until the two gamma-curves are the same ones.

The following examples illustrate, but are not limited to, some implementations of the above-mentioned display device.

Providing an example for an illustration, as shown in FIG. 2, the display screen may be, for example, a liquid crystal panel or a derivative thereof, such as a liquid crystal touch screen. Taking the liquid crystal panel as an example, the display screen 1 may include two polarizers 11, 12, an array substrate 13, a color filter substrate 14, and a liquid crystal layer 15. Each of the array substrate 13 and the color filter substrate 14 is disposed on one of the two polarizers 11, 12. The liquid crystal layer 15 is disposed between the array substrate 13 and the color filter substrate 14.

Specifically, as shown in FIG. 2, the liquid crystal layer 15 which is disposed between the array substrate 13 and the color filter substrate 14 may include first liquid crystals and second liquid crystals (not shown), wherein the second liquid crystals are different from the first liquid crystals. For example, the first liquid crystals are located within the first display region R1. Also, the second liquid crystals are located within the second display region R2. For example, a spacer (not shown) can further be disposed between the first display region R1 and the second display region R2. The spacer can be surrounded into a circular ring by transparent optical glue, in order to isolate the first liquid crystals from the second liquid crystals. The spacer is arranged between the array substrate 13 and the color filter substrate 14 for fixing the array substrate 13 and the color filter substrate 14. Thus, the second display region R2 can be used to capture images, the first display region R1 and the second display region R2 can be used to display images together. In such a way, it can also help to avoid a dark area appearing between the first display region R1 and the second display region R2.

Figure 3:
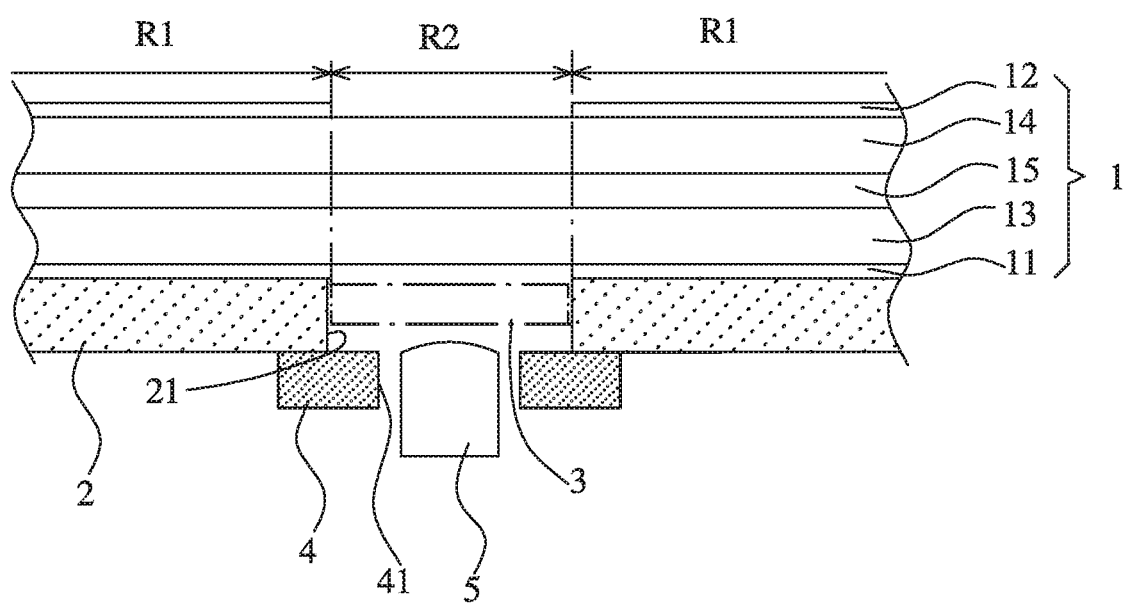
FIG. 3 is a schematic cross-sectional view of a second example taken along the line A-A in FIG. 1.

Optionally, in an embodiment, as shown in FIG. 2, each of the two polarizers 11, 12 may be arranged within the first display region R1 and the second display region R2, such that the first display region R1 and the second display region R2 have the same polarization effect. Alternatively, as shown in FIG. 3, each of the two polarizers 11, 12 may only be arranged within the first display region R1 and not arranged within the second display region R2, such that the polarization effects of the first display region R1 and the second display region R2 are different, which is beneficial to increase the amount of light.

In addition, as shown in FIG. 2, the first backlight member 2 and the second backlight member 4 may be optical components capable of providing backlights to the display screen 1, such as a backlight shaped as a light source plate or arranged by linear or dot-shaped light sources. The first backlight member 2 can be arranged on one side of the display screen 1 that provides the first display region R1, for providing a backlight source that is aligned with a portion of the display screen 1 within the first display region R1. In such a way, the portion of the display screen 1 within the first display region R1 can be used to display images. The first opening 21 of the first backlight member 2 can be circular, but can also be square or in other shapes. The position of the first opening 21 can be located along a central axis of the first backlight member 2, but can also be at any position of the first backlight member 2, such as located at a corner. The first opening 21 is aligned with the second display region R2, such that the second display region R2 can be used to display images or not.

Further, the light guiding member 3 may be a component capable of guiding light uniformly out of a surface, such as an optical prism. Therefore, the backlight source (for instance, the light emitted from the second backlight member) can be evenly distributed within the whole second display region.

In addition, as shown in FIG. 2, the second backlight member 4 may be arranged on one side of the light guide 3 away from the display screen 1. In such a way, the light guiding member 3 is located between the display screen 1 and the second backlight member 4, to uniformly guide the light generated by the second backlight member 4 to the display screen 1. Furthermore, the second opening 41 of the second backlight member 4 corresponds to the cross-sectional shape of the camera 5.

In an embodiment, the second backlight member 4 and the first backlight member 2 may overlap around the first opening 21 to assist in eliminating the dark area between the first display region R1 and the second display region R2. For example, a width generated by overlapping the second backlight member 4 with the first backlight member 2 can be adjusted according to actual usage conditions. For example, the overlapped width does not exceed one half of a difference between an outer diameter and an inner diameter of the second backlight member, but is not limited to this relationship.

Therefore, the second backlight member can be used to provide a backlight source to the second display region of the display screen or not. In such a way, the portion of the display screen within the second display region can be used for displaying images or capturing images. When it used for capturing images, a joint portion between the second backlight member and the first backlight member can provide an effect of light supplementation. There will be no visual difference, such as brightness difference, due to a gap between the backlight members. Thus, the visual difference generated by the display device having an under-screen camera in the prior art can be improved.

The above-mentioned embodiments of the display device of the present disclosure can operate in a display mode and a lighting mode. When the display device is operated in the display mode, the second display region and the first display region both provide display function in order to display a picture in a coordinated manner, to realize a screen-to-body ratio of nearly 100% on mobile phones. When the display device is operated in the lighting mode, the first display region can provide a display function while the second display region can provide a lighting function to meet requirements of photography with high light transmittance, thereby achieving compatibility of the display mode and the lighting mode of the display device.

Figure 4:
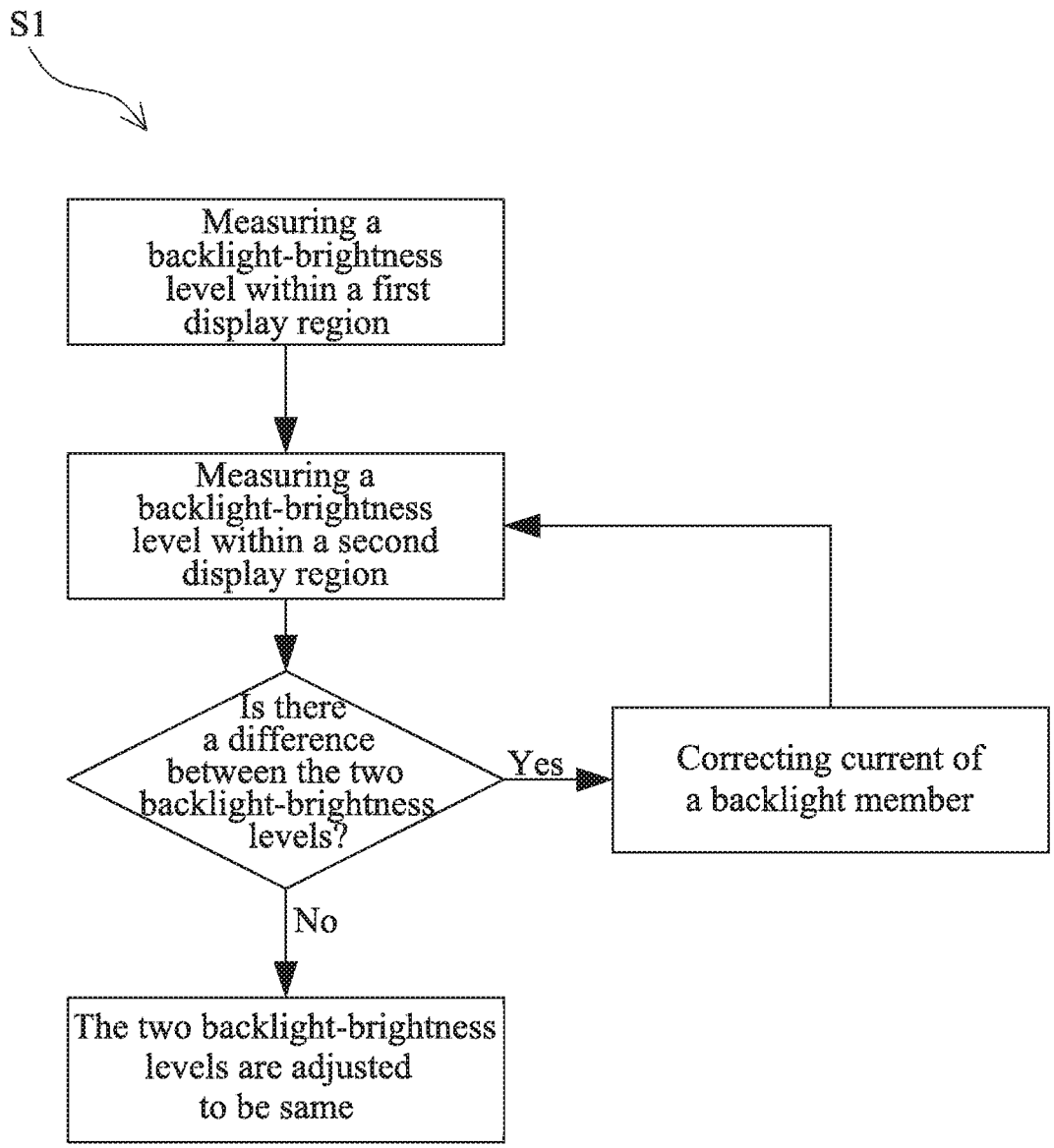
FIG. 4 is a schematic flowchart of performing a brightness adjustment process performed by a display optimization method, according to an embodiment of the present embodiment.
Figure 5:
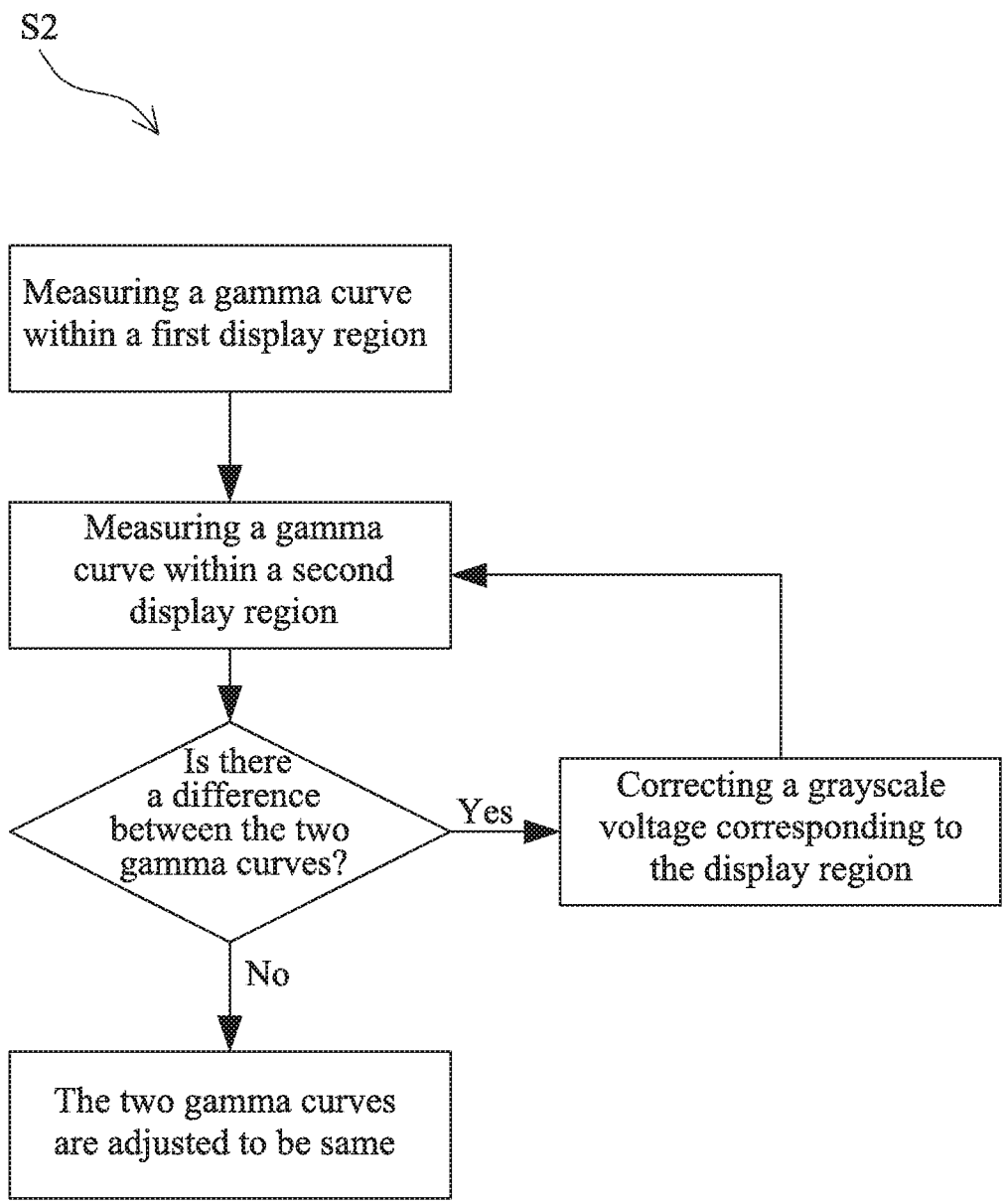
FIG. 5 is a schematic flowchart of performing a grayscale adjustment process performed by the display optimization method, according to an embodiment of the present embodiment.

Furthermore, as shown in FIGS. 4 and 5, a display optimization method of an embodiment of the present disclosure can be applied to a display device having two adjacent display regions. For example, the display device has a first display region and a second display region. Taking the above-mentioned embodiments of the display device as examples, the display optimization method may include a brightness-adjusting step S1 and a grayscale-adjusting step S2. For example, the brightness-adjusting step S1 and the grayscale-adjusting step S2 may be sequentially performed in order to obtain the optimal adjustment effect.

Optionally, as shown in FIGS. 2 and 4, the brightness-adjusting step S1, which is capable of acquiring two backlight-brightness levels that are measured within the two adjacent display regions (such as the first display region R1 and the second display region R2), adjusting backlight current of one of the two adjacent display regions (such as increasing or decreasing driving current of the first backlight member 2 or the second backlight member 4) according to a difference between the backlight-brightness levels, and repeatedly performing the brightness-adjusting step until the two backlight-brightness levels are the same ones. Therefore, it is beneficial to eliminate the difference in the backlight-brightness levels between two adjacent display regions, so as to reduce the visual difference.

It should be understood that the brightness-adjusting step is used to adjust the backlight-brightness levels within two adjacent display regions. For example, obtain the backlight-brightness levels within different display regions above the display screen 1, so as to know whether the backlight-brightness levels within the different display regions are different. For example, when the backlight current needs to be adjusted, the driving current of the first backlight member can be adjusted by the first backlight driver, and the driving current of the second backlight member can be adjusted by the second backlight driver, in which a current generation process can be understood by those skilled in the art and will not be repeatedly described here.

In an embodiment, as shown in FIG. 4, the brightness-adjusting step S1, which is capable of measuring the two backlight-brightness levels within the first display region R1 and the second display region R2, performing a determination for determining whether the two backlight-brightness levels are the same ones. if yes, stopping the brightness-adjusting step, if no, correcting the backlight-current for the second display region R2 (such as the driving current of the second backlight member) according to a current-to-luminance curve (i.e., I-L curve), re-measuring the backlight-brightness level for the second display region R2, and then re-performing the determination regarding the backlight-brightness levels until the two backlight-brightness levels are the same ones. Therefore, it is beneficial to eliminate the difference in backlight-brightness between two adjacent display regions, so as to reduce the visual difference.

Optionally, as shown in FIGS. 2 and 5, the grayscale-adjusting step S2, which is capable of acquiring two gamma-curves that are measured within the two adjacent display region (such as the first display region R1 and the second display region R2), adjusting a grayscale-voltage of one of the two adjacent display regions (such as increasing or decreasing the grayscale-voltage of the first display region R1 or the second display region R2) according to a difference between the two gamma-curves, and repeatedly performing the grayscale-adjusting step until the two gamma-curves are the same ones. For example, the gamma-curve may be selected to, but is not limited to, 2.2. Therefore, if the grayscale-adjusting step is performed after the brightness-adjusting step, the optimized luminous brightness can be adopted as a basis for adjusting the gamma-curve, which is more conducive to eliminating the visual difference between the two adjacent display regions, so as to optimize the overall display effect.

It should be understood that the gamma-curve represents a relationship between the chromaticity characteristics (e.g., grayscale value) and the luminous brightness of input signals of the display screen. The grayscale-adjusting step is used for adjusting the grayscale-voltage of the display screen (such as a liquid crystal screen). In such a way, the difference in the gamma-curve drawn from the grayscale obtained from the two adjacent display regions can be eliminated. The gamma-curve shows the relationship between the brightness and the grayscale recognized by the human eye. A generation method of the gamma-curve is understandable by those skilled in the art and will not be repeatedly described here.

In an embodiment, as shown in FIG. 5, the grayscale-adjusting step S2, which is capable of measuring the two gamma-curves within the first display region R1 and the second display region R2, performing a determination for determining whether the two gamma-curves are the same ones; if yes, stopping the grayscale-adjusting step; if no, correcting the grayscale-voltage of the second display region R2 according to a voltage-to-transmittance curve (i.e., V-T curve), re-measuring the gamma-curve of the second display region, and then re-performing the determination regarding the gamma-curves. Therefore, it is beneficial to eliminate the visual difference between the two adjacent display regions, so as to optimize the overall display effect.

Optionally, in an embodiment, as shown in FIG. 2, the two adjacent display regions can be set to the first display region R1 and the second display region R2, in order to perform the brightness-adjusting step S1 and the grayscale-adjusting step S2.

Figure 6:
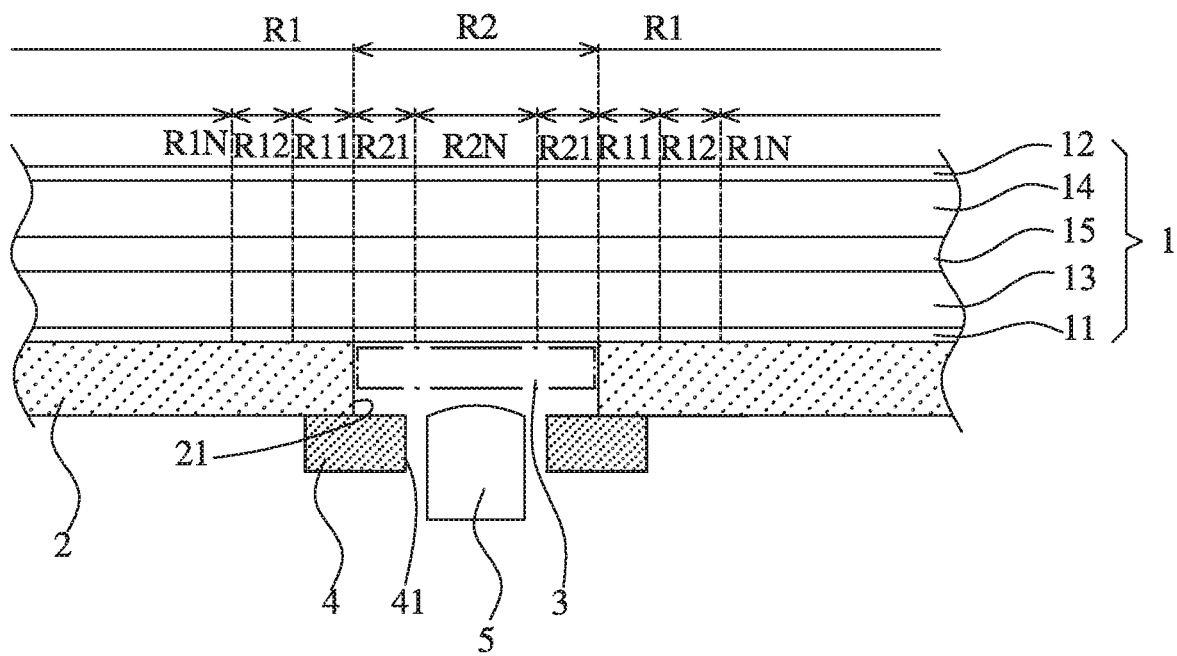
FIG. 6 is a schematic cross-sectional view of a display region configured into a plurality of sub-regions, according to an embodiment of the present disclosure.

Alternatively, in an embodiment, as shown in FIGS. 2 and 6, the two adjacent display regions can be set to the first display region R1 and the second display region R2 (as shown in FIG. 2), in order to perform the brightness-adjusting step S1. Also, the two adjacent display regions can be divided into a plurality of sub-regions (as shown in FIG. 6), in order to perform the grayscale-adjusting step S2. For example, the first display region R1 can be divided into a plurality of sub-regions (such as annular sub-regions R11, R12, and R1N) and the second display region R2 can be divided into a plurality of sub-regions (such as annular sub-region R21 and circular sub-region R2N shown in FIG. 6). For example, the number of sub-regions in the second display region may be less than the number of sub-regions in the first display region. In addition, the two adjacent display regions are set to adjacent two of the sub-regions (such as R2N and R21). Therefore, the grayscale-voltage of each sub-region of the display screen can be corrected in turn, and the grayscale between the sub-regions can be fine-tuned to make the picture which is continuously and naturally transited from the first display region to the second display region, to optimize the overall display effect.

In an embodiment, as shown in FIG. 6, the grayscale-adjusting step S2, which is capable of measuring the two gamma-curves within the two sub-regions, performing a determination for determining whether the two gamma-curves are the same ones; if yes, stopping the grayscale-adjusting step; if no, correcting the grayscale-voltage for one having a smaller outer diameter of the two adjacent sub-regions according to a voltage-to-transmittance curve, re-measuring the gamma-curve of one having the smaller outer diameter of the two adjacent sub-regions, and then re-performing the determination regarding the gamma-curves. Therefore, it is beneficial to eliminate the visual difference between the two adjacent display regions, so as to optimize the overall display effect.

The display device and display optimization method of the present disclosure adjust the backlight current of two adjacent display regions according to the difference between the backlight-brightness levels of the two adjacent display regions until the two backlight-brightness levels of the two adjacent display regions are the same ones. Further, the grayscale voltages of the two adjacent display regions are adjusted according to the difference of the gamma-curves between the two adjacent display regions until the gamma-curves of the two adjacent display regions are the same ones.

Therefore, the visual differences (such as brightness and grayscale) between the two adjacent display regions are eliminated, and the situation of the visual differences within the display regions in the prior art can be improved. When the display device is operated in a display mode, a picture can be displayed in a coordinated manner, to realize a screen-to-body ratio of nearly 100% on mobile phones. When the display device is operated in a lighting mode, requirements of photography and display can be met, so as to realize the compatibility of display and photography in the display device.

The present disclosure has been described in the above-mentioned related embodiments, but the above-mentioned embodiments are only examples for implementing the present disclosure. It must be pointed out that the disclosed embodiments do not limit the scope of the present disclosure. On the contrary, modifications and equivalent arrangements included in the spirit and scope of the claims are all included in the scope of the present disclosure.

What is claimed is:

1. A display device, comprising:
a display screen configured to provide a first display region and a second display region, wherein the display screen comprises two polarizers, an array substrate, a color film substrate, and a liquid crystal layer, each of the array substrate and the color film substrate is disposed on one of the two polarizers, the liquid crystal layer is disposed between the array substrate and the color film substrate, and each of the two polarizers is arranged within the first display region;
a first backlight member disposed on one side of the display screen providing the first display region, wherein the first backlight member has a first opening that is aligned with the second display region;
a light guiding member disposed in the first opening of the first backlight member;
a second backlight member disposed on one side of the light guiding member away from the display screen, wherein the second backlight member has a second opening, and the second backlight member and the first backlight member overlap around the first opening;
a camera disposed in the second opening of the second backlight member;
a first backlight driver electrically connected to the first backlight member;
a second backlight driver electrically connected to the second backlight member; and
a controller electrically connected to the first backlight driver and the second backlight driver, wherein the controller adjusts backlight-current of one of the first backlight member and the second backlight member according to a difference between two backlight-brightness levels that are measured within the first display region and the second display region, until the two backlight-brightness levels are the same ones.

2. The display device as claimed in claim 1, further comprising a display driver that is electrically connected to the display screen and the controller, wherein the controller is configured to adjust a grayscale-voltage for one of the first display region and the second display region according to a difference between two gamma-curves that are measured within the first display region and the second display region, until the two gamma-curves are the same ones.

3. A display device, comprising:
a display screen configured to provide a first display region and a second display region;
a first backlight member disposed on one side of the display screen providing the first display region, wherein the first backlight member has a first opening that is aligned with the second display region;

a light guiding member disposed in the first opening of the first backlight member;

a second backlight member disposed on one side of the light guiding member away from the display screen, wherein the second backlight member has a second opening;

a camera disposed in the second opening of the second backlight member;

a first backlight driver electrically connected to the first backlight member;

a second backlight driver electrically connected to the second backlight member; and a controller electrically connected to the first backlight driver and the second backlight driver, wherein the controller adjusts backlight-current of one of the first backlight member and the second backlight member according to a difference between two backlight-brightness levels that are measured within the first display region and the second display region, until the two backlight-brightness levels are the same ones.

4. The display device as claimed in claim 3, further comprising a display driver that is electrically connected to the display screen and the controller, wherein the controller is configured to adjust a grayscale-voltage for one of the first display region and the second display region according to a difference between two gamma-curves that are measured within the first display region and the second display region, until the two gamma-curves are the same ones.

5. The display device as claimed in claim 3, wherein the display screen comprises two polarizers, an array substrate, a color film substrate, and a liquid crystal layer, each of the array substrate and the color film substrate is disposed on one of the two polarizers, the liquid crystal layer is disposed between the array substrate and the color film substrate, and each of the two polarizers is arranged within the first display region.

6. The display device as claimed in claim 3, wherein the second backlight member and the first backlight member overlap around the first opening.

7. A display optimization method which is applied to a display device providing two adjacent display regions, wherein the display optimization method comprises:

a brightness-adjusting step for acquiring two backlight-brightness levels that are measured within the two adjacent display regions, adjusting backlight-current for one of the two adjacent display regions according to a difference between the backlight-brightness levels, and repeatedly performing the brightness-adjusting step until the two backlight-brightness levels are the same ones; and a grayscale-adjusting step for acquiring two gamma-curves that are measured within the two adjacent display region, adjusting a grayscale-voltage of one of the two adjacent display regions according to a difference between the two gamma-curves, and repeatedly performing the grayscale-adjusting step until the two gamma-curves are the same ones.

8. The display optimization method as claimed in claim 7, wherein the two adjacent display regions are set to a first display region and a second display region, the first display region is around the second display region, to perform the brightness-adjusting step and the grayscale-adjusting step.

9. The display optimization method as claimed in claim 8, wherein the grayscale-adjusting step comprises measuring the two gamma-curves within the first display region and the second display region, performing a determination for determining whether the two gamma-curves are the same ones; if yes, stopping the grayscale-adjusting step; if no, correcting the grayscale-voltage of the second display region according to a voltage-to-transmittance curve, re-measuring the gamma-curve of the second display region, and then re-performing the determination regarding the gamma-curves.

10. The display optimization method as claimed in claim 8, wherein the brightness-adjusting step comprises measuring the two backlight-brightness levels within the first display region and the second display region, performing a determination for determining whether the two backlight-brightness levels are the same ones; if yes, stopping the brightness-adjusting step; if no, correcting the backlight-current for the second display region according to a current-to-luminance curve, re-measuring the backlight-brightness level for the second display region, and then re-performing the determination regarding the backlight-brightness levels.

11. The display optimization method as claimed in claim 7, wherein the two adjacent display regions are set to a first display region and a second display region, the first display region is around the second display region, to perform the brightness-adjusting step; and both of the two adjacent display regions are divided into a plurality of sub-regions, in which the two adjacent display regions are set to adjacent two of the sub-regions, to perform the grayscale-adjusting step.

12. The display optimization method as claimed in claim 11, wherein the grayscale-adjusting step comprises measuring the two gamma-curves within the two sub-regions, performing a determination for determining whether the two gamma-curves are the same ones; if yes, stopping the grayscale-adjusting step; if no, correcting the grayscale-voltage of one having a smaller outer diameter of the two adjacent sub-regions according to a voltage-to-transmittance curve, re-measuring the gamma-curve of one having the smaller outer diameter of the two adjacent sub-regions, and then re-performing the determination regarding the gamma-curves.

13. The display optimization method as claimed in claim 11, wherein the brightness-adjusting step comprises measuring the two backlight-brightness levels within the first display region and the second display region, performing a determination for determining whether the two backlight-brightness levels are the same ones; if yes, stopping the brightness-adjusting step; if no, correcting the backlight-current for the second display region according to a current-to-luminance curve, re-measuring the backlight-brightness level for the second display region, and then re-performing the determination regarding the backlight-brightness levels.

\* \* \* \* \*